US005083257A

United States Patent [19]

Kennedy

[11] Patent Number: 5,083,257

[45] Date of Patent: Jan. 21, 1992

[54] BIT PLANE PARTITIONING FOR GRAPHIC DISPLAYS

[75] Inventor: Peter D. Kennedy, Mesa, Ariz.

[73] Assignee: Motorola, Inc., Schaumburg, Ill.

[21] Appl. No.: 617,488

[22] Filed: Nov. 23, 1990

Related U.S. Application Data

[63] Continuation of Ser. No. 343,769, Apr. 27, 1989, abandoned.

[51] Int. Cl.[5] .......................... G06F 3/14; G09G 1/16

[52] U.S. Cl. .................................... 395/131; 340/799; 340/703

[58] Field of Search ................ 364/518, 521; 340/703, 340/734, 799, 798

[56] References Cited

U.S. PATENT DOCUMENTS

| | | | |
|---|---|---|---|
| 4,509,043 | 4/1985 | Mossaides | 340/721 |
| 4,528,636 | 7/1985 | Robinson, III | 364/521 |
| 4,628,305 | 12/1986 | Ikeda | 340/703 |
| 4,818,979 | 4/1989 | Mamson | 340/723 |
| 4,835,527 | 5/1989 | Hersh | 340/703 |
| 4,910,687 | 3/1990 | Butler et al. | 364/521 |
| 4,933,879 | 6/1990 | Ando et al. | 364/522 |
| 4,935,730 | 6/1990 | Kosuka | 340/723 |
| 4,943,937 | 7/1990 | Kasano et al. | 364/521 |
| 4,951,229 | 8/1990 | DiNicola et al. | 364/521 |

OTHER PUBLICATIONS

Conner, "Color Palette Chips Bundle Extra Features with RAM Look-Up Table and DACs", *EDN*, Sep. 29, 1988, pp. 67-76.

*Primary Examiner*—Gary V. Harkcom
*Assistant Examiner*—Raymond J. Bayerl
*Attorney, Agent, or Firm*—Frank J. Bogacz; Jordan C. Powell

[57] ABSTRACT

A bit plane partitioned graphics display system prioritizes large numbers of classes of information prior to relaying the information to the color lookup table. This allows the color lookup table to process only 12 or less bits of information at a time. The graphics display system comprises n bit planes for storing the information to be displayed and outputting a pixel word having n bits, where n is the number of bits of information input to the graphics display system, bit plane masking for altering groups of the n bit planes without affecting the information on the other bit planes, pixel word processor for modifying bits of each pixel word output from the n bit-planes, a prioritizer for determining which information has the highest priority and outputting only the highest prioritized bits of information in 12 or less bits, intermediate color lookup tables for converting each group of bits in each pixel word into a set of bits that will produce the desired color, a color lookup table for outputting red, green, or blue color signals based upon the prioritizer output, digital-to-analog converters for converting these color signals into analog form, and a graphics display screen for displaying the red, green, and blue color analog signals.

6 Claims, 2 Drawing Sheets

-PRIOR ART-

BIT PLANE PARTITIONING FOR GRAPHIC DISPLAYS

This application is a continuation of prior application Ser. No. 343,769, filed Apr. 27, 1989, now abandoned.

BACKGROUND OF THE INVENTION

This invention relates in general to displaying information on graphics display screen, and more specifically to increasing the amount of informaion which can be displayed upon a single graphics display screen.

Graphic display screens are made up of thousands of small elements called picture elements, or pixels. In general, these pixels are arranged in horizontal rows. For example, a commonly used display format employs 1024 such rows with 1280 pixels in each row. In a color display, each pixel is made up of three fluorescent elements that, when acted upon by three separate electron beams, produce red, green, and blue light of variable intensities. Consequently, the color and intensity of each pixel is determined by information transmitted by the three electron beams. In a typical digital graphics display, the information that controls the electron beams, and hence the colors of the various pixels, is provided by a color look-up table within the graphics display circuitry. This color look-up table supplies three parallel sequences of n-bit digital numbers. These parallel sequences are converted to three equivalent analog signals for the purpose of controlling the three electron beams. In typical systems, n is generally 4 or 8.

The color lookup table is controlled by a set of bits of information supplied from a memory circuit. The memory circuit has p bit planes, where p is the number of bits of information that control each pixel. Each bit planes comprises memory space corresponding to the number of pixels on the graphics display screen. For example, a bit plane for a $1024 \times 1280$ pixel display will include 1,310,720 memory elements. In a typical display application, each bit plane, or group of bit planes, represents a specific type of information which must be displayed on the screen. The bit planes are prioritized according to the importance of the informaton. For instance, a map might be shown upon the graphics display screen as a combination of background coloring, contour lines and specific landmarks or sites of interest. The background color and its associated bit planes will have the lowest priority. The contour lines and their associated bit planes will have intermediate priority, and the specific landmarks and their associated bit planes will have the highest priority. The contents of the color look-up table will assure that information on a higher prioritized bit plane, or group of bit planes, will overlay, or cover, information on a lower prioritized bit plane or group of bit planes.

A user of a graphics display system might desire several different types of operations to allow flexibility in the system. For instance, operators commonly desire large numbers of independent bit planes, or groups of bit planes, to allow manipulation of many classes of data. These classes might include map features such as boundaries, roadways, railroads, transmission lines, and buildings. Preferably, changes in one class of data should be effectuated without disturbing the other classes of data.

Another common desire of graphics display users is the ability to move lines, symbols, or alpha-numerical characters in an animated fashion without altering or otherwise disturbing the background map. Two groups of data are displayed alternatively to generate the animated characters without altering the background map. This process is referred to as doublebuffering or ping-ponging. Double-buffering is accomplished by connecting two or more sets of bit planes to the lookup table. When information is being read from one set by the lookup table, new information relating to the animated characters are written to the other set by the original data source.

Another common desire of graphics display users is the ability to temporarily delete all data in a given class or classes without disturbing anything else on the display; that is, making certain information (class of information) particularly noticeable by removing other unwanted information. Other applications might require all symbols of a given class to blink (that is, disappear and reappear with a given frequency) or to have only one or several symbols of a given class blink (blinking is often controlled by a blink plane associated with the bit planes that controls the given class of data) to emphasize those symbols of classes. The user also might want to have all objects of a given class appear in a designated color or to appear in the original colors but with a change in intensity.

These desired functions are currently performed using multiple bit planes. Multiple bit planes store the data, or information, and generate the electronic signals carrying the information to the color lookup table. Multiplex switches select alternative sets of bit plane data in the double buffering process, and control the color lookup table. When double-buffering is required, all bit planes must be duplicated even if most of the data is constant and only a small part of it is changing. Additionally, the lookup table becomes very complex when a large number of bit planes are required for graphics displays having many required classes of information. These are the principal limitations of current equipment.

The most complex systems currently available illustrate the limitations of conventional systems. These complex systems convert 12-bit pixel descriptions into three sets of 8 bits each for the red, green and blue signals. The systems must provide $2^{12} \times 24 = 98,304$ storage locations in the color lookup table. This number of storage locations may practically be incorporated within graphics display computers. However, larger pixel descriptions would become technically impractical, or if technically feasible, then extremely expensive. For instance, 16-bit pixel descriptions would require $2^{16} \times 24 = 1,572,864$ storage locations, and 24-bit pixel descriptions would require $2^{24} \times 24 = 4.027(10)^8$ storage locations in the color lookup table. Such color look up tables are not economically feasible.

SUMMARY OF THE INVENTION

It is therefore an object of the present invention to provide a graphics display system which can accommodate 12, 16, 24 or even greater numbers of bit planes technically and economically.

A bit plane partitioned graphics display system accomplishes the above object of the invention by prioritizing large numbers of classes of information prior to applying the information to the color lookup table. This allows the color lookup table to process only 12or less bits of information at a time, depending upon the actual number of colors required. The graphics display system comprises p bit planes for storing the information to be displayed and outputting pixel words, each consisting of p bits, where p is the number of bits of information input to the graphics display system; bit plane masking for altering groups of the p bit planes without affecting the information on other bit planes; pixel word processor for modifying the bits of each pixel word output from the p bit planes; a prioritizer for determining which information has the highest priority and outputting only the highest prioritized bits of information in 12 or less bits; a color lookup table with associated digital-to-analog converters for outputting red, green, or blue color signals based upon the prioritizer output; and a graphics display screen for displaying the red, green, and blue color elements of each pixel.

The above and other objects, features, and advantages of the present invention will be better understood from the following detailed description taken in conjunction with the accompanying drawings.

DETAILED DESCRIPTION OF THE INVENTION

Figure 1:
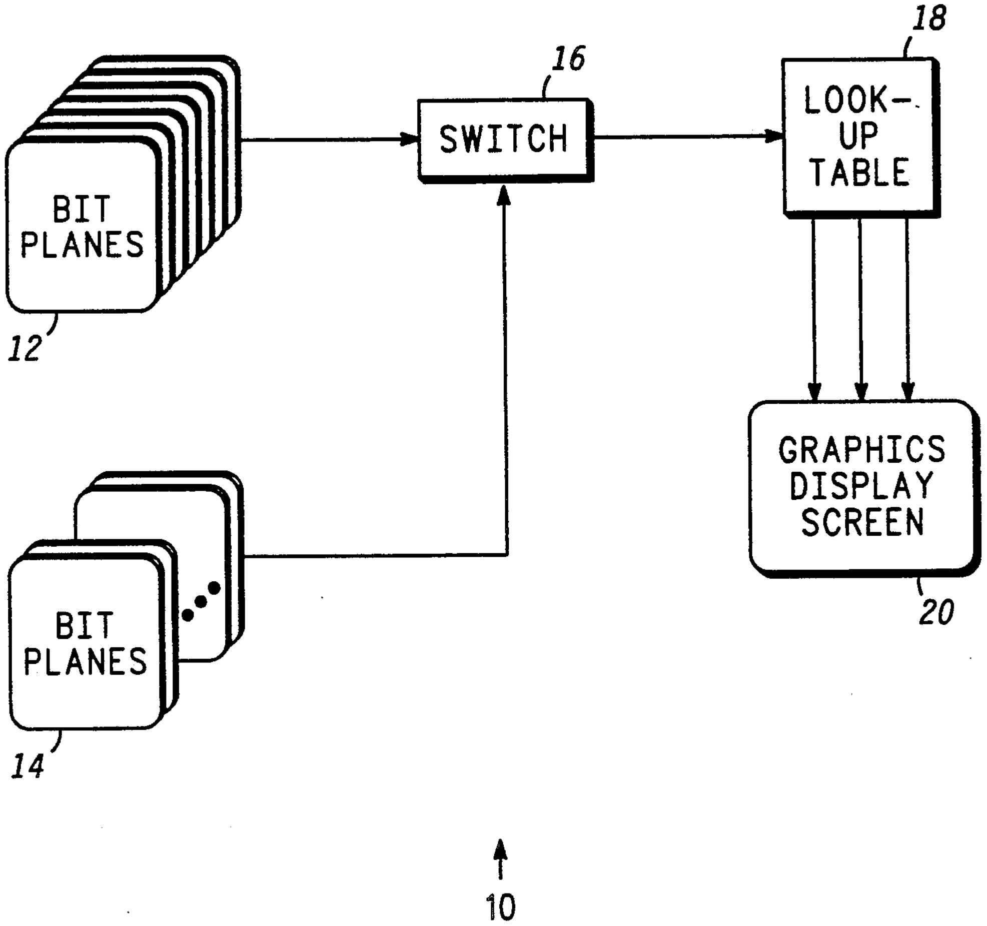
FIG. 1 is a block diagram of the general operation of a graphics display system.

FIG. 1 shows the general operation of a graphics display system having 8 bit planes for 8 bits of information to be displayed. Specifically, a graphics display system 10 includes bit planes 12 and 14, switch 16, lookup table 18 and graphics display screen 20.

To produce an image on graphics display screen 20, information is first written to bit planes 12 or bit planes 14 from the original data sources (not shown). Bit planes 12 and bit planes 14, in this embodiment, each comprise 8 specific bit planes. Each set of 8 corresponding bits in the bit planes represent separate pieces of information which can be displayed on graphics display screen 20. Each bit plane, or groups of bit planes, within bit planes 12 is arranged in a hierarchial order. For instance, if the image to be represented on the graphics display screen 20 is a map of a given area, a lower prioritized group of bit planes would probably contain information for the map background. A higher prioritized bit plane would represent specific points of interest on the map. When such information is displayed on the graphics display screen, the information having the higher prioritization within the hierarchy is overlaid on the information stored on the lower prioritized bit plane. The lookup table selects the highest prioritized information within each pixel word. Therefore, only the highest prioritized information can be seen by a viewer of graphics display screen 20.

In this embodiment, bit planes 12 and bit planes 14 each output an 8-bit set of information, or pixel word. Switch 16 alternatively allows the pixel words from bit planes 12 or bit planes 14 to be output to lookup table 18. Alternating the outputs of bit planes 12 and bit planes 14 is the double-buffering required to produce an "animated" effect of information on graphics display screen 20. Through double-buffering of bit planes 12 and bit planes 14, an "old" pixel word may be read for display while a "new" pixel word is being written from the original data source. In other words, when a first image for graphics display screen 20 is output from bit planes 12, a second image, having various changes from the first image, is output as another pixel word to buffer 16. When storage of the second image is completed the roles of bit planes 12 and 14 are then reversed, with the image from bit planes 14 read while a new image is being stored in bit planes 12. The process is repeated indefinately to produce an "animated" image.

Lookup table 18 is coupled to bit planes 12 and 14 to receive the pixel words. Lookup table 18 generates three sets of 8-bit signals from the pixel words. The three 8-bit sets of signals correspond to red, green and blue pixel elements. Lookup table 18 is coupled to graphics display screen 20 to relay the three sets of signals for display on graphics display screen 20.

It should be noted that the three 8-bit sets of signals from lookup table 18 must be processed through digital-to-analog converters (not shown) to be displayed on graphics display screen 20.

Lookup table 18, for a graphics display system having 8 bit planes in bit planes 12 requires $2^8 \times 24 = 6,144$ storage locations. These storage locations define 256 different colors which can be represented on graphics display screen 20. In fact, each of the 256 colors available for a given loading of lookup table 18 can be selected from $2^{24} = 16,777,217$ possibilities. Lookup table 18, for a graphics display system having 12 bit planes, requires $2^{12} \times 24 = 98,304$ storage locations. In other words, the storage locations of lookup table 18 increase exponentially as the number of bit planes in bit planes 12 increases. For example, if 16-bit planes are required in an application, lookup table 18 would require $2^{16} \times 24 = 1,572,864$ storage locations. Similarly, a 24-bit plane graphics display system requires $2^{24} \times 24 = 4.027(10)^8$ storage locations in lookup table 18. This large amount of storage locations could not be feasibly or economically constructed. As a practical matter, present graphics display systems are limited to a maximum of 12 bits of information, and most systems only provide 8 bits of information.

Figure 2:
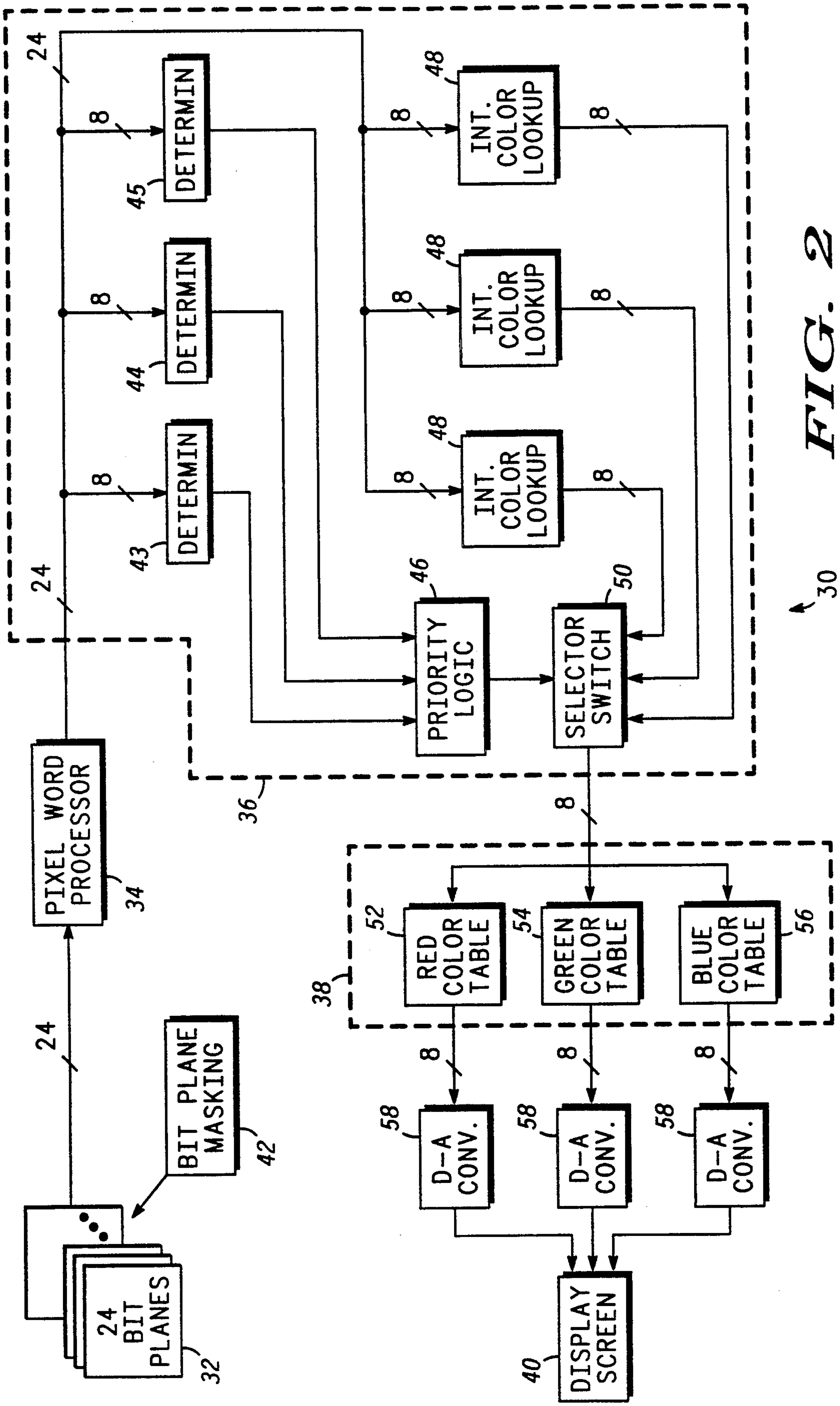
FIG. 2 is a block diagram of a bit plane partitioned graphics display system according to the present invention.

FIG. 2 shows a bit plane partitioned graphics display system 30 in its preferred embodiment according to the present invention. Bit plane partitioned graphics display system 30 comprises bit planes 32, pixel word processor 34, prioritizer 36, lookup table 38 and display screen 40. Bit planes 32 of FIG. 2, in this embodiment, includes 24 bit planes, but may incorporate any number of bit planes. As with bit planes 12 of FIG. 1, the 24 bit planes of bit planes 32 are arranged according to a hierarchial order. In other words, information representing higher priority items to be displayed on display screen 40 is arranged in positions of higher priority with respect to bit planes of lesser importance.

Bit planes 32 further comprises a bit plane masking 42. Bit plane masking 42 allows partitioning of the 24 bit planes of bit planes 32 into groups of corresponding information for editing purposes. This partitioning is important because, in many applications, more than one bit plane may be required to represent a given class of information. For example, the class might be moving vehicles, and each type of vehicle would be indicated by a distinctive color. In such a case, the items of vehicle information might be constantly changing while other information (e.g. the map background) remains unchanged. Bit plane masking 42 can assign two groups of planes to the dynamic data. This allows the information in tone or the other of the groups to be modified without disturbing the information in the other dynamic or static bit planes. Bit plane masking 42 incorporates special types of video RAM (random access memory) devices to facilitate the group altering process.

During read-modify-write cycles, bit plane masking 42 enters new data into the selected group of bit planes. Bit plane masking 42 selects the appropriate group of bit planes to be modified, and updates the information on the group bit planes immediately following a read cycle. Bit plane masking 42 can be used dynamically for entering data into different groups from corresponding sources as the information from the corresponding sources changes.

Pixel word processor 34 is coupled to bit planes 32 to receive a 24-bit information signal, or stream of 24-bit pixel words. Pixel word processor 34 allows an operator to mask certain information in order to highlight information of specific interest. For instance, a map may contain background, contours, landmarks and some type of changing, or "animated", information. An operator using the map may desire to remove contour and landmarks to make the display less cluttered. The operator can then concentrate on the important animated information. Pixel word processor 34 allows masking of undesired information by altering the value of the appropriate bits in each pixel word. Specifically, pixel word processor 34 can either allow the designated bits of each pixel word to pass through unchanged, force designated bits to 0, or force designated bits to 1. This process can be used to: a) suppress a certain class, or classes, of data by making all bits zero; b) forcing all pixels of a certain class, or classes, to a given color; or c) control the intensity of a certain class, or classes, of data. This process has been termed pixel masking and is described in EDN, Sept. 29, 1988, Page 69.

Pixel word processor 34 can also be used for double-buffering of a designated class of data. Two sets of bit planes can be assigned to represent "current" and "new" data, respectively, of the designated class. In a first phase of the read-write-cycle, pixel word processor 34 suppresses the set of bit planes representing the new data, and allows only current data to be displayed. The bit planes representing the new data are written to concurrently with the read cycle of the current data. When the writing of the new data is completed for a given cycle, the new data is displayed while the other set of bit planes which represented the "current" data are suppressed. The suppressed set of bit planes are then up-dated. If desired, this process can be used to show three or more alternative versions of the same data class in sequence.

Pixel word processor 34 can be used in the above manner to double-buffer any graphics display system.

Pixel word processor 34 is coupled to prioritizer 36. Pixel word processor 34 supplies each 24-bit pixel word to prioritizer 36 in either an altered, or unaltered, state. The 24-bit pixel word is organized in three 8-bit sets of information arranged in hierarchical order.

Prioritizer 36 comprises determinants 43, 44 and 45, priority logic 46, intermediate color lookup tables 48, and selector switch 50. In the preferred embodiment, determinants 43, 44 and 45 each receive an 8-bit set of information from pixel word processor 34. It should be noted that 8 bits of information per set is used with the 24-bit pixel word due to ease of operation and compatibility with 8-bit input lookup table 38 having 6,144 storage locations. If a 12-bit lookup table were used having 98,304 storage locations, the sets of information from the 24-bit pixel word would each contain 12 bits of information. In such a case, two 12-bit determinants would be required. Correspondingly, if pixel word processor 34 output a 16-bit information set and an 8-bit lookup table is used, only two determinants would be required to process the 16-bit pixel word.

Determinants 43, 44 and 45 each receive one of the 8-bit information sets and determine whether any 1's are present in that particular set. The outputs of each of determinants 43, 44 and 45 are 1 bit long. If determinants 43, 44 or 45 find a 1 in their respective sets of information received from pixel word processor 34, a 1 in the 1-bit output is relayed to priority logic 46. If there are no 1's in an 8 bits set of information received by a determinant, a 0 is output from that determinant. The 1-bit outputs are used by priority logic 46 to control which 8-bit set of information will control the subsequent color lookup process. For example, if the lowest priority set, as examined by determinant 43, includes a map background, and no higher priority symbol appears in that set, and further, if no higher priority set as examined by determinants 44 and 45, contains any 1's, the bits representing the map background will control the color lookup process. If the second highest priority set, as examined by determinant 44, contains one or more 1's but there are no 1's in any higher priority sets, as examined by determinant 45, the lower priority set from determinant 43 will be inhibited, and the second highest priority set will control the color. If the highest priority set, as examined by determinant 45, contains one or more 1's, it will control the color.

Priority logic 46 is coupled to determinants 43, 44 and 45 to receive the highest priority 8-bit set of information containing a 1, and relays this signal to selector switch 50.

Intermediate color lookup tables 48 are each coupled to pixel word processor 34 to receive the 8-bit sets of information. Each of the intermediate color lookup tables 48 receives an 8-bit set of information from pixel word processor 34 corresponding to the 8-bit sets of information received by determinants 43, 44 and 45. The 8-bit sets of information are processed to produce appropriate inputs to selector switch 50.

In general, any combination of 1's and 0's might occur in each of the three 8-bit set of information. However, each such given combination will be required to produce the appropriate one of the three different colors, depending on the 8-bit set in which it occurs. To achieve this result, each of the intermediate color lookup tables 48 operates to convert each 8-bit set to a different 8-bit set that, when applied to color lookup table 38, will produce a color corresponding to the original combination of 1's and 0's. Intermediate color lookup tables 48 also prioritizes groups of data that might occur within each set of bits. If a data group within a given 8-bit set has a higher priority than other data within that set, intermediate color lookup tables 48 will generate an 8-bit signal corresponding to the highest prioritized data group. As a result, the 8-bit signals from intermediate color lookup tables 48 will pass on to selector switch 50 the color designations for the highest prioritized group of data in each set. Intermediate color look-up tables 48 and look-up table 38 are programmed by the display user to assign specific colors to the various classes of original data.

Selector switch 50 is coupled to intermediate color lookup tables 48 to receive the 8-bit signal outputs. Selector switch 50 is also coupled to priority logic 46 to receive the output signal corresponding to the 8-bit set of information having the highest priority. Selector switch 50 allows the appropriate single 8-bit set of information to pass from intermediate color lookup tables 48 to lookup table 38 as determined by the output signal from priority logic 46. For example, if the second highest prioritized 8-bit set of information contains 1's and the highest prioritized 8-bit set of information does not contain 1's, priority logic 46 will send a corresponding signal to selector switch 50. Selector switch 50 will then send only the second highest prioritized 8-bit set of information received from intermediate color lookup tables 48 to color lookup table 38. Therefore, only one 8-bit set of information will be received by color lookup table 38, and this set will represent the highest class of data that is to be displayed. In other words, prioritizer 36 acts as a filter allowing only the highest prioritized information would overlay any lower prioritized information, no information will be lost which would otherwise be displayed.

Lookup table 38 is coupled to selector switch 50 to receive the 8-bit set of information having the highest priority. Lookup table 38 comprises red color table 52, green color table 54 and blue color table 56. Red color processor 52 receives the 8-bit information signal and produces an 8-bit signal corresponding to the desired intensity of the red element. Similarly, green color processor 54 and blue color processor 56 produce 8-bit signals corresponding to the desired intensities of the green and blue elements.

Digital-to-analog converters 58 are coupled to lookup table 38 to receive the digital 8-bit red, green and blue 8-bit color signals, and convert these signals to analog signals. Display screen 40 receives the analog signals and displays the desired colors resulting in the displayed information from bit planes 32.

Thus, there has been provided in accordance with the present invention a bit plane partitioned graphics display system that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as followed in the spirit and broad scope of the appended claims.

I claim:

1. A graphics display system for displaying large numbers of classes of information comprising:

bit plane means for storing a plurality of bits of information, said bit plane means having a predetermined number of n bit planes corresponding to said plurality of bits of information;

said n bit planes arranged according to a priority of visual importance of said bits of information;

said bit plane means generating a pixel word having n bits of information;

said pixel word arranged into sets of information, said sets of information arranged in a priority corresponding to said priority of visual importance of said bits of information;

pixel word processor means coupled to said bit plane means to receive said pixel word;

said pixel word processor means for altering selective bits of information of said pixel word;

prioritizer means coupled to said pixel word processor means to receive said pixel word;

said prioritizer means for selecting the highest prioritized set of said sets of information and outputting said highest prioritized set of said sets of information;

said prioritizer means including:

a selector switch;

a plurality of intermediate color lookup table means coupled in parallel between said bit plane means and said selector switch; and said plurality of intermediate color lookup table means for generating a p-bit (where p is an integer number representing the number of bits of information) definition signal defining a p-bit code corresponding to colors within said lookup table means for the highest prioritized information within each of said sets of information;

lookup table means coupled to said prioritizer means to receive said highest prioritized set;

said lookup table means for generating a plurality of sets of color information corresponding to said highest prioritized set, each of said plurality of sets representing a primary color displayed on the graphics display system;

display screen means coupled to said lookup table means to receive said plurality of sets of color information; and said display screen means for generating a graphics display picture.

2. A graphics display system for displaying large numbers of classes of information according to claim 1 wherein said display system further comprises:

bit plane masking means coupled to said bit plane means;

said bit plane masking means for writing to at least one of said n bit planes at a time without disturbing information of other of said n-bit planes; and said bit plane masking means arranging said at least one of said n-bit planes into groups of information to be altered.

3. A graphics display system for displaying large numbers of classes of information according to claim 1 wherein said prioritizer means comprises:

a plurality of determinant means coupled to said bit plane means;

said plurality of determinant means receiving one each of said prioritized sets of information of said pixel word;

said plurality of determinant means for determining which of said prioritized sets of information includes meaningful information;

said plurality of determinant means generating a plurality of determinant outputs;

priority logic means coupled to said plurality of determinant means to receive said plurality of determinant outputs;

said priority logic means for generating a priority output corresponding to the highest prioritized of said prioritized sets of information containing meaningful information;

said selector switch coupled to said bit plane means to receive said prioritized sets of information of said pixel word, and further coupled to said priority logic means to receive said priority output;

said selector switch for relaying one of said sets of information from said bit plane means to said look up table means;

said selector switch selecting said relayed one of said sets of information determined according to said priority output; and said selector switch coupled to said look up table means to supply said selected one of said sets of information.

4. A method for displaying large numbers of classes of information that are defined by, for example, 16, 24, or 32 bits, in a graphics display system when using a graphics display color lookup table capable of processing significantly less bits of information, said method comprising the steps of:

storing the information in n bit planes prioritized according to the importance of information to be displayed, where n is the integer number of bits of information to be displayed;

generating n-bit pixel words having a plurality of prioritized sets of information within each n-bit pixel word, each of said sets of information having less bits of information than said n-bit pixel words, said bits of information of said sets of information corresponding to the number of the bits of the graphics display color lookup table;

relaying said n-bit pixel words to a pixel word processor;

altering selective bits of said n-bit pixel words within said pixel word processor;

relaying said altered n-bit pixel words to a prioritizer;

determining which set of said sets of information of said n-bit pixel words has the highest prioritized information;

said step of determining including the steps of:

relaying said n-bit pixel words in parallel to a plurality of determinants and to a plurality of intermediate lookup tables, wherein one each of said sets of information are relayed to one each of both of said plurality of determinants and said plurality of intermediate lookup tables;

determining within said determinants which of sets of information contain information to be displayed;

generating a one-bit signal, within each of said plurality of determinants when a respective one of said sets of information contains meaningful information; and outputting said highest prioritized set of information to the color lookup table.

5. A method for displaying large numbers of classes of information, that are defined by, for example, 16, 24, or 32 bits, in a graphics display system when using a graphics display color lookup table capable of processing significantly less bits of information according to claim 4, wherein said step of determining which set further comprises the steps of:

relaying said one-bit signals to a priority logic circuit;

generating within said priority logic circuit a priority signal which corresponds to the highest prioritized one of said sets of information having significant information;

relaying said priority signal to a selector switch;

determining within said plurality of intermediate lookup tables a plurality of color code signals for the highest prioritized information within each of said sets of information;

relaying said plurality of color code signals to said selector switch;

determining within said selector switch the highest prioritized one of said sets of information; and outputting said highest prioritized one of said sets of information to the color lookup table.

6. A prioritizer for a graphics display system where the graphics display system must display large numbers of classes of information but may only process smaller numbers of bits of information within the color lookup table, and the graphics display system includes n bit planes outputting a pixel word arranged in prioritized sets of information, where n is the number of bits of information to be displayed by the graphics display system, said prioritizer comprising:

a plurality of determinant means coupled in parallel to said bit planes;

each of said plurality of determinant means receiving one each of said prioritized sets of information of said pixel word;

each of said plurality of determinant means for generating an output when the received prioritized set of information contains information for display;

priority logic means coupled to each of said plurality of determinant means to receive said output;

said priority logic means for generating a priority output corresponding to the highest prioritized of said prioritized sets of information which contains information for display;

a plurality of intermediate color lookup table means coupled in parallel to said bit planes to receive one each of said prioritized sets of information of said pixel word;

said plurality of intermediate color lookup table means for generating a plurality of n-bit definition signals defining n-bit codes corresponding to colors within the color lookup table for the highest prioritized information within each of said sets of information;

selector switch coupled to said plurality of intermediate color lookup table means to receive said n-bit definition signals, and further coupled to said priority logic means to receive said priority output;

said selector switch for relaying one of said n-bit definition signals to the color lookup table;

said selector switch selecting said relayed one of said n-bit definition signals according to said priority output; and said selector switch coupled to the color lookup table to supply said selected one of said n-bit definition signals.

* * * * *